S. L. SIMPSON.
Ruler.
No. 48,454.
Patented June 27, 1865.
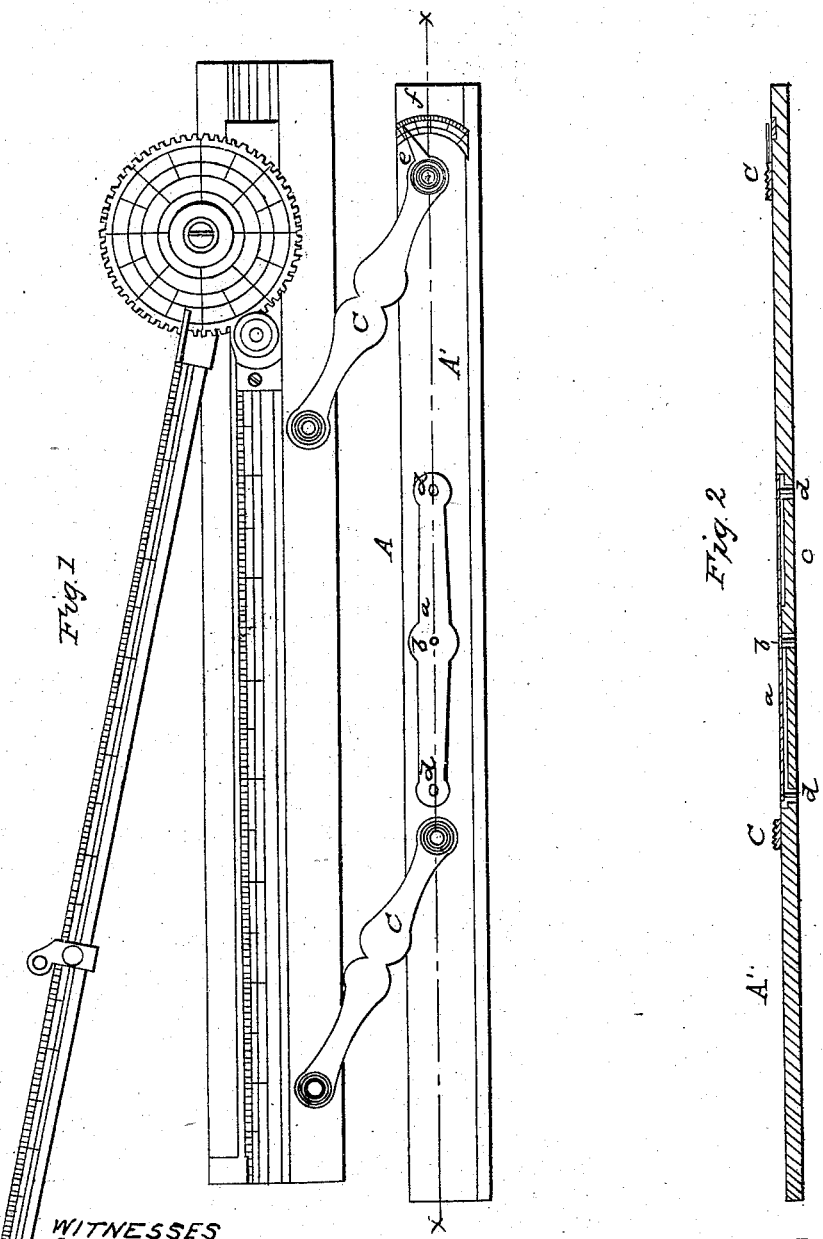

UNITED STATES PATENT OFFICE.

S. L. SIMPSON, OF NEW YORK, N. Y.

IMPROVEMENT IN RULERS.

Specification forming part of Letters Patent No. 48,454, dated June 27, 1865.

*To all whom it may concern:*

Be it known that I, S. L. SIMPSON, of No. 64 Cedar street, in the city, county, and State of New York, have invented a new and useful Improvement in Parallel and other Rulers; and I do hereby declare that the following is a full, clear, and exact description thereof, which will enable others skilled in the art to make and use the same, reference being had to the accompanying drawings, forming part of this specification, in which—

Figure 1 is a plan or top view of this invention. Fig. 2 is a longitudinal vertical section of the same, the line $x\,x$, Fig. 1, indicating the plane of section.

Similar letters of reference indicate like parts.

This invention consists in the employment or use of two or more spring-stops applied to a strip of sheet metal, which is secured to the upper surface of the ruler, in combination with holes bored clear through the ruler in such a manner that by pressing the fingers on the ends of the strip of sheet metal the stops are depressed on the paper or other surface on which the ruler is to be used and accidental slipping of said ruler on the surface supporting it is prevented.

A represents a parallel ruler of that class generally used by sailors for the purpose of plotting their day's work, laying out courses, &c., and provided with an adjustable compass, disk, and swinging arm, as described in a patent granted to Henry Taylor, December 20, 1864. It must be remarked, however, that my present improvements are applicable to parallel rulers of any desired construction, and one part of my invention is applicable to plain rulers. This last-named part consists of a strip, $a$, of sheet-brass or other suitable hard and elastic material, cut in the form shown in Fig. 1, or in any other desirable form or shape. It is firmly secured to the part A' of the parallel ruler at about the middle of its length and of the length of the ruler by a screw or pivot, $b$, being let in, so that its surface is flush with that of the ruler and its ends extend out in cavities $c$, as clearly shown in Fig. 2. From said ends project studs or stops $d$ through holes in the ruler, and when the ruler is placed down on a chart or on a piece of paper or other surface, by pressing on the ends of the strip $a$ the stops $d$ are caused to press on the surface supporting the ruler, and an accidental slipping of the same is prevented. The advantage of this improvement, particularly to parallel rulers, is so apparent that it requires no further explanation.

The two parts of my parallel ruler A are connected by two arms or links, C, in the usual manner. From the end of one of these links extends an index, $e$, and as the parallel ruler is opened this index sweeps over a scale, $f$, marked on a piece of metal which is let into the ruler or otherwise attached to the same. The scale is marked off in such a manner that it indicates by inches and parts of inches the distance to which the parallel ruler is opened. If it is desired, for instance, to draw a series of lines at certain fixed distances apart, this object can be effected by the aid of the index and scale in the most simple and expeditious manner. No compass, rule, or other instrument for measuring is required, and the additional cost in the construction of the parallel ruler is a mere trifle.

I claim as new and desire to secure by Letters Patent—

The spring-stops $d$, applied in combination with a ruler, A', substantially as and for the purpose set forth.

S. L. SIMPSON.

Witnesses:
M. M. LIVINGSTON,
C. L. TOPLIFF.